Feb. 13, 1940.    W. M. KEPPERS    2,190,071
CALCULATING PROTRACTOR
Filed June 19, 1937
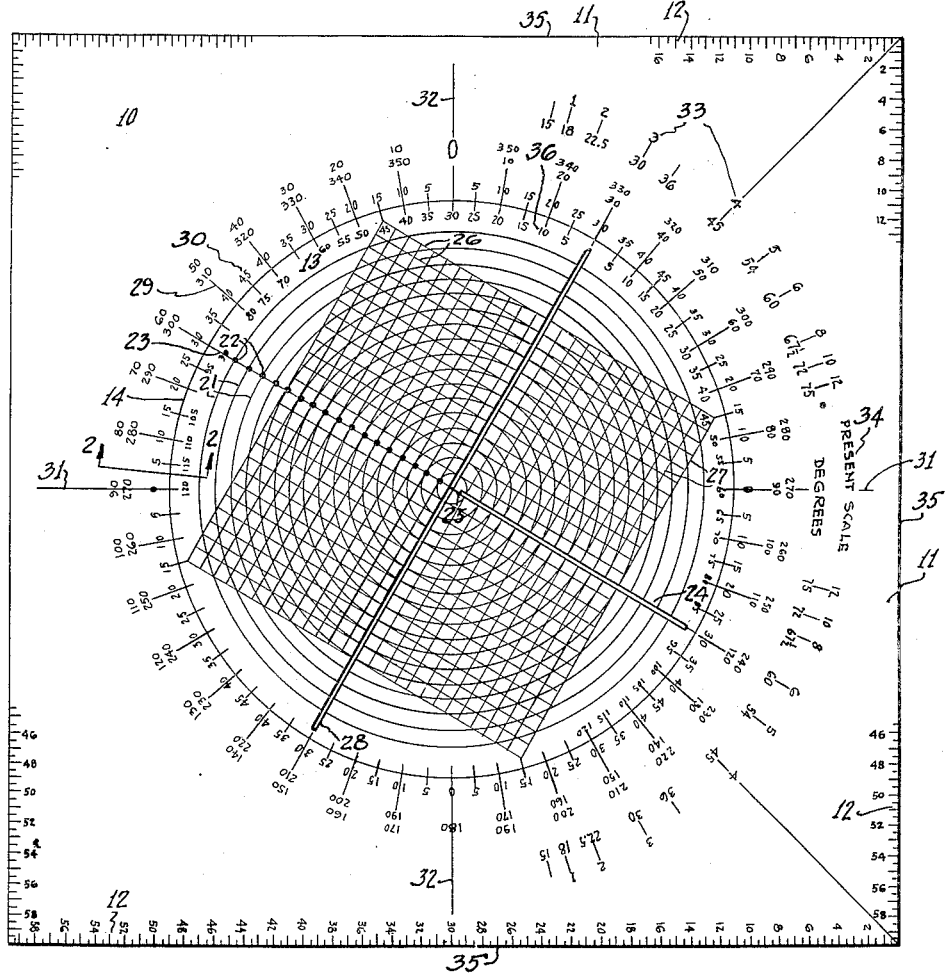
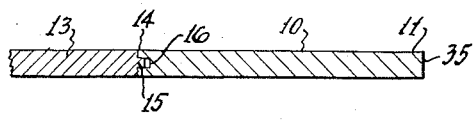
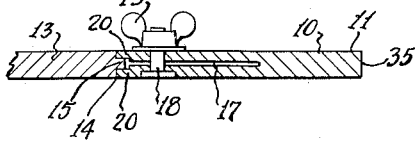
INVENTOR.
W. M. KEPPERS
BY
ATTORNEY.

Patented Feb. 13, 1940

2,190,071

UNITED STATES PATENT OFFICE 2,190,071

CALCULATING PROTRACTOR

William M. Keppers, Portland, Oreg.

Application June 19, 1937, Serial No. 149,192

4 Claims. (Cl. 33—75)

This invention relates generally to the graphic arts, and particularly to a calculating protractor.

The main object of this invention is the construction of an improved form of instrument particularly designed for craftsmen in the graphic arts and adapted to enable them to give a fuller expression of their ideas by simplifying the laying out of angles or circles as well as the measurement thereof for reproductive purposes.

The second object is the construction of a protractor by means of which angles or circles may be easily measured or laid off by artists or printers.

The third object is the construction of a device in the class described in which the printer, for example, can determine from a piece of advertising copy the correct angularity of the material which must be cut in order to place an insert in position when said angle is a departure from the usual vertical or horizontal set-up.

The fourth object is to reduce or convert the present printing scale for making angles to degrees and to further provide graduations which will enable the reader to read angles in the minimum necessary degrees for cutting in different directions about the entire circumference of the protractor.

The fifth object is the construction of a device in the class described in which a simplified method of calculating is provided to draw units with any number of sides or radiating units.

The sixth object is to so construct the device that convenient pencil slots and holes are provided for laying off angles or circles which have once been determined.

The seventh object is to so construct the device that convenient grooved markings are provided to enable one to see at a glance what angle is necessary to reproduce a layout and also to use the grooves for overmarking when a specified size is to be laid out.

I accomplish these and other objects in the manner set forth in the following specification as illustrated in the accompanying drawing, in which:

Fig. 1 is a plan of the protractor.

Fig. 2 is a fragmentary section taken along the line 2—2 in Fig. 1.

Fig. 3 is a fragmentary section similar to Fig. 2 but showing a modified form of clamp.

Similar numerals refer to similar parts throughout the several views.

Referring in detail to the drawing, there is shown a square body 10, having displayed around the outer margin 11 the graduations 12 which are preferably in printer's measure.

Mounted in the center of the body 10 is a revolvable transparent disc 13 whose outer edge 14 is provided with a tongue 15 adapted to engage the groove 16 of the body 10. The groove 16 may be provided with a slot 17 as shown in Fig. 3.

In this form of the device a clamping screw 18 and wing nut 19 are employed to clamp the portions 20 of the body 10 upon the tongue 15. On the revolvable disc 13 are inscribed the concentric circles 21. These may either conform to printer's measure or to any other system of measurement desired.

It is desirable to provide the holes 22 where the circles 21, preferably grooved, intersect the radial line 23. A radial slot 24 is formed in disc 13. The purpose of the holes 22 is to enable the user to scribe a circle by merely inserting his pencil point in the hole 22 to get a given radius.

It is also desirable to inscribe a plurality of equally spaced lines 26, preferably grooved, which are parallel with the line 23 and a plurality of lines 27, also preferably grooved which normally intersect the lines 26 forming a cross-sectioned rectangular figure, the center of which coincides with the center 25. A slot 28 is formed through the disc 13 normal to the slot 24. The slots 24 and 28 do not intersect or extend to the outer edge of the disc 13. The purpose of the slots 24 and 28 are to enable the user to draw a right angle at any desired angle by inserting his pencil in the slots making a right angle, then turning the disc 13 to complete a rectangle or any desired angle.

On the body 10 and surrounding the disc 13 are the graduations 29 preferably in degrees, reading being given in clockwise and counter-clockwise directions completely around the circumference of the disc 13. The values in degrees 30 extending forty-five degrees in each direction from the median lines 31 and 32 are also indicated. The purpose of the scale 30 is to reduce any degree within the radius of a circle to its lowest necessary equivalent to conform with printing machinery in cutting material to form angles.

For the sake of convenience a printer's circular scale is indicated by means of the numbers 33 some of which indicate the angle required to cut a figure having the number of sides indicated. For example, to cut a four sided figure, the angles of the corners would be forty-five degrees which would correspond with the number 4 on what is referred to as the present scale 34.

The operation of the device is as follows:

Assuming that an artist wishes to prepare copy for an advertisement and that he desires to place a panel in the advertisement which is inclined away from the usual horizontal alinement, he merely places his instrument upon his copy so that one of the lateral edges 35 will correspond with the base line of his layout and then turns the disc 13 until a slot 24 or 28 coincides with one edge of the panel. If he wishes to calculate the size of the panel, he can read the size exactly by counting or reading the lines 26 and 27 which may of course be numbered to facilitate such reading. He may favor the instrument in either direction so as to avoid fractional readings.

He may either place these dimensions and readings on the draft or the printer on the other hand, may actually read his directions with a similar instrument by placing his instrument on his layout to be reproduced and turning the disc 13 until any line or number of the lines 26 and 27 coincides with any or all edges of the panel to be reproduced. This will enable him to determine easily and accurately the correct angularity and dimensions of the material required to set up an advertisement containing the particular panel illustrated in the copy.

The purpose of the grooved lines 26 and 27 is to enable the artist or printer for example to find the angularity of any specified rectangle for instance when it is to be placed within a given space or column width at an angle. This is accomplished by temporarily filling in or overmarking the desired grooves with pencil marks. The same is true of the circles 21 when a specified size of circle is desired.

The purpose of the scale 36 is to enable an artist for instance to draw a figure with a specified number of sides or sectors by a simplified method of calculating. For example, to draw a hexagon place the slot 28 or holes 22 sixty degrees (⅙ of circle) from a base line using scale 36. Then mark through hole 22 or draw a line through slot 28. Then revolve disc 13 until sixty degrees on scale 36 corresponds with dot or line you have made and repeat this process until the entire radius is completed. The same is true in drawing a radiating unit such as a star for instance.

In order that the present invention may be better understood, it is stated that in the printing art there are used tapered wedges cut to an angle for spacing material to hold the angle in its proper position. Any of these individual wedges can be used in eight different directions within the radius of a circle. On the ordinary circle protractor this would indicate eight different figure readings in degrees, as for instance, a wedge cut 45 degrees and the first position would read 45, the second position 90, the third 135, etc., up to 360. Printing machinery to cut these wedges is built to cut up to 45 degrees only which is all that is necessary to reproduce any angle.

My arrangement of numbering the graduations reduces any degree within a circle to its lowest necessary equivalent (45 degrees or less) without written or mental calculation. For example, 270 is 45. This is a division from the ordinary protractor numbering and is arranged as follows:

The protractor is divided into four equal sectors or quarter sections at right angles to one another and numbered (beginning at the median lines 31 and 32) from zero to 45, then continuing in reverse order from 44 back to zero. This divides the protractor into eight equal sectors of 45 degrees, each of which is numbered from zero to 45, each sector being numbered in reverse order to the next adjoining sector, as is shown on the drawing.

I claim:

1. A device of the class described consisting of a rectangular member having a circular opening formed therein and having a transparent rotatable disc mounted therein, said member and disc having units of circular measure indicated about the adjacent edges of the disc and opening to coincide with each other, said disc being characterized by having at least two radial slots at right angles formed through a portion of its diameter through which slots a pencil point may be inserted and moved to form a line on a surface beneath same.

2. A device of the class described consisting of a rectangular member having a circular opening formed therein and having a transparent rotatable disc mounted therein, said member and disc having units of circular measure indicated about the adjacent edges of the disc and opening to coincide with each other, said disc being characterized by having a plurality of concentric grooved circles inscribed upon it.

3. A device of the class described consisting of a rectangular member having a circular opening formed therein and having a transparent rotatable disc mounted therein, said member and disc having units of circular measure indicated about the adjacent edges of the opening and disc to coincide with each other, said disc being characterized by having pencil point openings formed in a radial direction at points of intersection with said circles through which a pencil may be inserted for the purpose of marking a surface beneath same.

4. In a device of the class described, the combination of a square body of sheet material having a revolvable circular insert of transparent material, said insert having cross-section lines formed thereon, said square body member having marks thereon parallel to the sides thereof whereby the square member may be orientated with relation to a base line in the copy and the circular member may be orientated with relation to an insert in the copy.

WILLIAM M. KEPPERS.